April 27, 1937.  B. F. PARR ET AL  2,078,682
FILTER CLOTH HOLDER
Filed Feb. 8, 1935
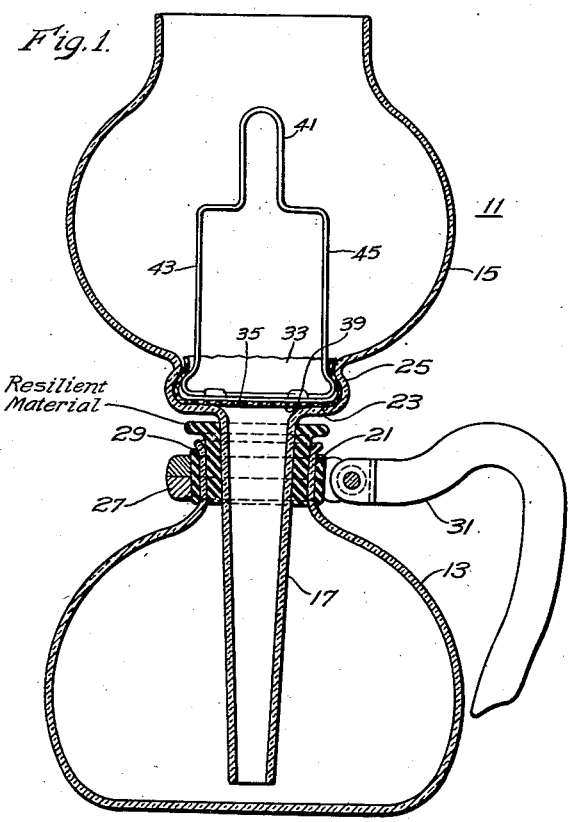
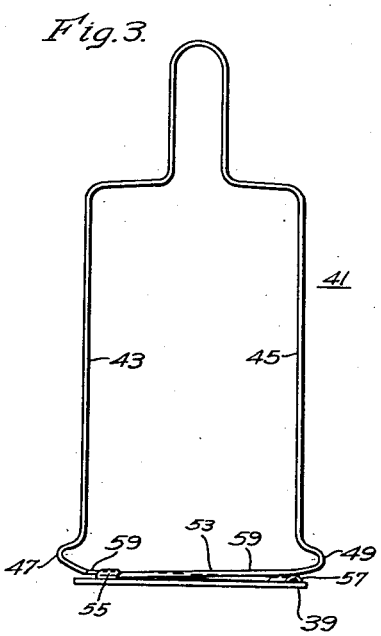
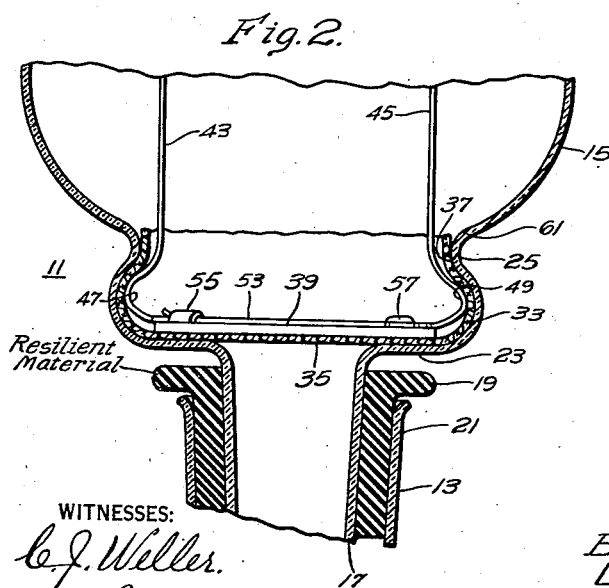
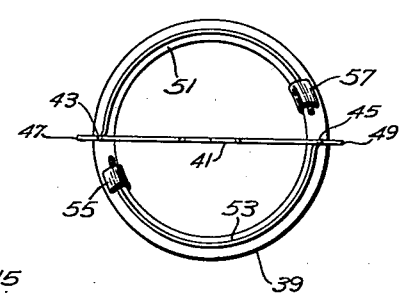
WITNESSES:
INVENTORS
Bernard F. Parr and
Lewis J. Greenawalt.
BY
ATTORNEY Patented Apr. 27, 1937

2,078,682

UNITED STATES PATENT OFFICE 2,078,682

FILTER CLOTH HOLDER

Bernard F. Parr and Lewis J. Greenawalt, Mansfield, Ohio, assignors to Westinghouse Electric & Manufacturing Company, East Pittsburgh, Pa., a corporation of Pennsylvania Application February 8, 1935, Serial No. 5,558

6 Claims. (Cl. 210—162)

Our invention relates to coffee making machines and particularly to filter assemblies for such devices.

An object of our invention is to provide a novel and simple filter assembly for a coffee making machine that shall comprise a minimum number of parts.

Another object of our invention is to provide a filter assembly that shall be easily insertable in and removable from a coffee making machine, by a push or pull on the assembly.

Another object of our invention is to provide a filter assembly that shall be so designed that the strainer cloth shall be yieldingly pressed downwardly against an annular seat in the coffee making machine.

Other objects of our invention will either be specifically pointed out hereinafter in the course of a description of a form of device now preferred by us, or will be apparent from the description itself.

In practicing our invention, we provide a flat ring locatable within a strainer cloth, which cloth may be of flat bowl shape, and a handle having an intermediate part of substantially inverted U-shape extending at right angles to the wire, with radially bent-out arcuate portions at the lower ends of the legs of the member of inverted U-shape, which connect them with substantially semi-circular end portions located adjacent to one face of the ring, the extreme ends of the semi-circular portions being secured to the ring at diametrally spaced points.

In the single sheet of drawings:

Figure 1 is a view, in vertical section, through a glass coffee-making machine with which is associated the device embodying our invention, Fig. 2 is a fragmentary view, in vertical section, and on a slightly longer scale, of a portion of the assembly shown in Fig. 1, Fig. 3 is a view in front elevation of the frame part of our strainer cloth holder, and Fig. 4 is a top plan view of the parts shown in Fig. 3.

Referring first to Figs. 1 and 2 of the drawing, we have there illustrated a glass coffee maker 11 comprising a lower bowl-shaped container 13 into which, as is well known, the water for making the coffee is initially placed. The device 11 includes an upper container or casing 15, both members 13 and 15 being preferably made of glass. The lower part of the upper container or casing 15 has a funnel member 17 depending therefrom, the upper end of which is located within a resilient tubular stopper 19 which, in turn, fits tightly in the upper neck portion 21 of the lower container 13, all in a manner well known in the art.

The upper end of funnel 17 is enlarged to provide a laterally extending flat seat portion 23 of somewhat larger diameter than the upper end of funnel 17, as well as with a return-bent portion 25 providing, in effect, an annular shoulder immediately above the substantially flat annular seat 23 which is, of course, located in a substantially horizontal plane in a device of the kind shown in Figs. 1 and 2 of the drawing.

A clamping ring 27 is located around the neck portion 21 being spaced therefrom by a resilient collar 29. The clamp 27 may be made in any suitable or desired manner in order to have secured thereto one end of a handle 31 to permit of carrying either the entire assembly or of carrying only the lower casing, all in a manner now well known in the art.

It is necessary to associate with the lower container 13 and the upper container 15 a strainer cloth assembly to initially receive and contain coffee grounds placed therewithin, and it is, of course, desirable to be able to easily and quickly replace the strainer cloth with a new strainer cloth after one of such cloths has been used a certain number of times.

The strainer cloth assembly, particularly constituting our invention, includes a strainer cloth 33 of any suitable or desired kind of cloth which is originally made of substantially circular shape, the peripheral edge thereof then being sewed as to gather the same and make it shorter, whereby the strainer cloth will comprise a substantially flat intermediate portion 35 and a wall portion 37 extending laterally of the flat intermediate portion to provide a bowl-shaped filter cloth. While we may use a draw string with the outer peripheral edge of the strainer cloth, we do not desire to be limited thereto since we have found that this is not an absolute necessity.

Means associated with the strainer cloth 33 for holding it and permitting of inserting it in and removing it from its proper operative position in the upper end of the funnel include a ring 39 which is located in a single plane and which is adapted to be located within the open top bowl shaped strainer cloth 33, as will be noted more particularly by reference to Figs. 1 and 2 of the drawing.

A wire handle 41 includes an upper intermediate portion of substantially inverted U-shape and comprising leg portions 43 and 45 which extend at substantially right angles to the plane of the ring 39. If desired, the distance between the upper parts of legs 43 and 45 may be reduced, as is shown in Figs. 1 and 3 of the drawing although this is not an essential element of our invention.

The lower ends of the respective leg portions 43 and 45 are provided with radially bent-out arcuate portions 47 and 49 extending radially beyond the ring 39, which connect the respective leg portions with substantially semi-circular portions 51 and 53, the extreme ends of each of which are secured against ring 39 at diametrically opposed points. The securing means is shown here as constituting lugs 55 and 57 integral with the flat ring 39 extending initially substantially radially inwardly and then being return-bent over the extreme ends of the semi-circular portions 51 and 53.

We wish to here point out that in the free position of the semi-circular portions 51 and 53, these may individually extend slightly angularly relatively to the flat ring 39 as will be noted more particularly at 59 in Fig. 3 of the drawing.

In order to insert the strainer cloth assembly embodying our invention into the upper casing 15 and into its proper operative position shown more particularly in Fig. 2 of the drawing, the bowl-shaped strainer cloth 35 is placed in proper operative position on the frame and the three members are then moved downwardly through the upper open end of upper container 15. Since the handle 41 is resilient in not only a plane at right angles to the ring 39 but also in a plane substantially parallel therewith, and since the arcuate bent-out portions 47 and 49 are separated from each other a distance greater than the inner diameter of the annular shoulder 25, a downward push on the upper end of handle 41 by an operator will cause the lower ends of legs 43 and 45 to move inwardly when pressed against the part 61 of the upper container (see Fig. 2); after which the upper part of each of the bent-out portions 47 and 49 will fit under the over-hanging annular shoulder 25, as is shown more particularly in Fig. 2 of the drawing. This will have the result that the ring 39 is pressed against the intermediate flat portion 35 of the strainer cloth and that the latter is pressed against the annular seat 23 at the upper end of funnel portion 17. It is, of course, obvious that the arcuate bent-out portions 47 and 49 and the substantially semi-circular portions 51 and 53 are also resilient in a vertical direction. This has the result that the handle portion of the filter assembly is resilient not only in a substantially horizontal direction but also in a substantially vertical direction, as well as in a third plane which extends at substantially right angles to the other two planes of resiliency. This makes it relatively easy to insert the filter assembly by a straight line pressure downwardly or in a direction aligned with a longitudinal axis of the funnel 17, and to remove the assembly by a pull on the handle exerted in a substantially opposite direction.

We here wish to point out particularly that the upper container 15 is closed relatively to the funnel 17, to prevent passage of solid particles of coffee grounds into funnel 17, by reason of the portion 35 of the strainer cloth being pressed against the peripheral or annular seat 23 by the action of the two bent-out arcuate portions located immediately above the ring 39 fitting underneath the annular overhanging shoulder 25.

The device embodying our invention thus provides a relatively simple filter or strainer cloth assembly embodying a minimum number of parts and including a rigid ring associated with a triply resilient handle located above the ring.

Various modifications may be made in the device embodying our invention without departing from the spirit and scope thereof, and we desire, therefore, that only such limitations shall be placed thereon as are imposed by the prior art or are set forth in the appended claims.

We claim as our invention:

1. In a coffee making machine comprising an upper casing having a funnel depending therefrom, said funnel having an annular seat and an annular shoulder thereabove, a filter assembly including a strainer cloth and a frame therefor, said frame including a ring located against the strainer cloth and a spring member, of substantially inverted U-shape the ends being secured to the ring and said spring member having leg portions with bulged-out portions near their ends to engage under the annular shoulder and force the ring and cloth into close engagement with the annular seat.

2. In a coffee making machine including an upper container having a funnel depending therefrom, said funnel having an annular seat and an annular shoulder overhanging the seat, a filter assembly comprising a strainer cloth and a positioning frame therefor, said frame including a flat rigid ring located within the strainer cloth and a resilient wire handle secured to the ring and having a pair of bent-out portions adapted to fit beneath the annular shoulder to press the ring and strainer cloth downwardly against the seat.

3. In a coffee making machine including an upper container having a funnel depending therefrom, said funnel having an annular seat and an annular shoulder overhanging the seat, a filter assembly comprising a strainer cloth and a positioning frame therefor, said frame including a flat rigid ring located within the strainer cloth and a resilient wire handle having an intermediate portion of substantially inverted U-shape extending at substantially right angles to the plane of the ring, each leg of the intermediate portion having a bent-out part, and end portions of substantially semi-circular shape located above the ring and means securing the respective ends of the semi-circular portions to the ring.

4. A coffee making machine comprising in combination, an upper container having a funnel depending therefrom, said funnel having an annular seat and an annular overhanging shoulder thereabove, a filter assembly comprising a strainer cloth and a positioning frame therefor, said frame including a rigid ring located within the strainer cloth and a wire handle secured to the ring and having portions extending respectively substantially parallel to and laterally of the plane of the ring, both of said portions being resilient to permit insertion into and removal of the ring from its operative position adjacent the annular seat by a force exerted at right angles to the plane of the ring, said laterally extending portions of the handle operatively engaging the shoulder to press the ring and strainer cloth against the seat.

5. A coffee making machine comprising in combination, an upper container having a funnel depending therefrom, said funnel having an annular seat and an annular overhanging shoulder thereabove, a filter assembly comprising a strainer cloth and a positioning frame therefor, said frame including a rigid ring located within and above the strainer cloth and a wire handle comprising an intermediate portion of substantially inverted U-shape extending laterally of the plane of the ring, each leg having an arcuate outwardly-extending portion adapted to fit beneath the annular shoulder portion, and substantially semicircular end portions extending substantially parallel with and above the ring and means rigidly securing the respective ends of the semicircular end portions against the upper surface of the ring.

6. A device as set forth in claim 5 in which the securing means comprises integral lugs on the ring bent over the wire ends.

BERNARD F. PARR.
LEWIS J. GREENAWALT.